United States Patent
Ryu

(10) Patent No.: US 11,247,718 B2
(45) Date of Patent: Feb. 15, 2022

(54) ELECTRIC STEERING COLUMN DEVICE FOR VEHICLE

(71) Applicants: Hyundai Motor Company, Seoul (KR); KIA Motors Corporation, Seoul (KR)

(72) Inventor: Sang Woock Ryu, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 221 days.

(21) Appl. No.: 16/572,207

(22) Filed: Sep. 16, 2019

(65) Prior Publication Data
US 2020/0398886 A1 Dec. 24, 2020

(30) Foreign Application Priority Data
Jun. 18, 2019 (KR) .................. 10-2019-0072104

(51) Int. Cl.
*B62D 5/04* (2006.01)
*F16D 1/10* (2006.01)

(52) U.S. Cl.
CPC .......... *B62D 5/043* (2013.01); *B62D 5/0463* (2013.01); *F16D 1/10* (2013.01); *F16D 2001/103* (2013.01)

(58) Field of Classification Search
CPC ......... B62D 5/043; B62D 5/0463; F16D 1/10; F16D 2001/103
See application file for complete search history.

(56) References Cited

U.S. PATENT DOCUMENTS

| | | | | | |
|---|---|---|---|---|---|
| 4,778,022 | A * | 10/1988 | Kamiya | .................. | B62D 6/10 180/443 |
| 6,755,746 | B2 * | 6/2004 | Barnley | .................. | F16D 1/08 403/359.5 |
| 7,874,222 | B2 * | 1/2011 | Steele | .................... | B60K 17/28 74/15.4 |
| 9,446,782 | B2 * | 9/2016 | Kurokawa | ............... | B62D 1/16 |
| 10,160,476 | B2 * | 12/2018 | Miyawaki | .............. | B62D 1/185 |
| 10,407,094 | B2 * | 9/2019 | Nemoto | .................. | B62D 6/10 |

FOREIGN PATENT DOCUMENTS

KR  10-2010-0072906 A  7/2010

* cited by examiner

*Primary Examiner* — Jacob D Knutson
(74) *Attorney, Agent, or Firm* — Lempia Summerfield Katz LLC

(57) ABSTRACT

An electric steering column device includes a column housing, and a first shaft, a connection shaft and a second shaft provided in the column housing. The connection shaft is movable in an axial direction of the first shaft and the second shaft and is connected to the first shaft and the second shaft so as to rotate together with the first shaft and the second shaft. The first and second shaft are connected to the connection shaft so that the first shaft always rotates at the same rotation speed and that a rotation speed of the second shaft is varied depending on whether or not the connection shaft moves in the axial direction. The device is capable of securing an optimized steering performance by adjusting steering responsibility of a steering wheel depending on a driving state of the vehicle.

10 Claims, 4 Drawing Sheets

ELECTRIC STEERING COLUMN DEVICE FOR VEHICLE

CROSS REFERENCE TO RELATED APPLICATION

The present application claims priority to Korean Patent Application No. 10-2019-0072104, filed Jun. 18, 2019, the entire contents of which is incorporated herein for all purposes by reference.

BACKGROUND

1. Technical Field

The present disclosure relates to an electric steering column device for a vehicle capable of improving steering performance.

2. Description of the Related Art

In general, a vehicle is driven by transferring a force to a road surface with tires interposed therebetween, which is configured to be controlled by moving front wheels or rear wheels through a steering device operated by a driver on a driver's seat.

Since large power is used in order to rotate a steering wheel used as such a steering device, large power is required in order to operate the steering wheel with force of a person. Therefore, a power steering system uses forces of an electric motor and a hydraulic pressure as auxiliary power.

The disclosure of this section is to provide background of the invention. Applicant notes that this section may contain information available before this application. However, by providing this section, Applicant does not admit that any information contained in this section constitutes prior art.

SUMMARY

Aspects of the present disclosure provide an electric steering column device for a vehicle capable of securing optimized steering performance by adjusting steering responsibility of a steering wheel depending on a driving state of the vehicle.

According to an embodiment of the present disclosure, an electric steering column device for a vehicle includes: a first shaft and a second shaft provided in a column housing and transferring a torque of a steering wheel to a gear box; a variable shaft provided in the column housing so as to be movable in an axial direction of the first shaft and the second shaft and connected to the first shaft and the second shaft so as to rotate together with the first shaft and the second shaft, the first shaft being connected to the variable shaft so that the first shaft always rotates at the same rotation speed as that of the variable shaft and the second shaft being connected to the variable shaft so that a rotation speed of the second shaft is varied as compared with the first shaft depending on whether or not the variable shaft moves in the axial direction; and a driving module installed on the column housing and transferring power to the variable shaft to allow the variable shaft to move in the axial direction.

The first shaft may be connected to one end portion of the variable shaft in a spline structure, and the second shaft may be connected to the other end portion of the variable shaft in a screw structure.

A first hole into which an insertion end portion of the first shaft is inserted may be formed in one end portion of the variable shaft, and spline gears extending in a straight line shape in the axial direction may be formed on an outer peripheral surface of the insertion end portion of the first shaft and an inner peripheral surface of the first hole so as to be matched to each other.

A second hole into which an insertion end portion of the second shaft is inserted may be formed in the other end portion of the variable shaft, and screw gears extending in a spiral shape in the axial direction may be formed on an outer peripheral surface of the insertion end portion of the second shaft and an inner peripheral surface of the second hole so as to be matched to each other.

The first shaft and the second shaft may be installed in the column housing so as to be rotatable through a first bearing and a second bearing, respectively.

The variable shaft may be installed in the column housing so as to be rotatable through a third bearing, and the third bearing may be installed in the column housing so as to be movable in the axial direction and be connected to the driving module and receive the power from the driving module to move.

The driving module may include: an electric motor fixedly installed in the column housing and including a pinion rotating at the time of transferring the power; and a rack bar coupled to the third bearing and gear-connected to the pinion to linearly move in the axial direction at the time of the rotation of the pinion.

The electric steering column device for a vehicle may further include a controller receiving driving information of the vehicle and controlling the driving module based on the driving information of the vehicle to control a moving direction of the variable shaft, thereby allowing a steering response speed to be changed due to the variation in the rotation speed of the second shaft.

Aspects of the invention provide an electric steering column device for a vehicle, comprising: a column housing; a first shaft, an intermediate or connection shaft and a second shaft provided in a column housing, and aligned along an axis in order; the intermediate shaft disposed between and interconnecting the first and second shafts, wherein the first, intermediate and second shafts are rotatable together about an axis; the first shaft connected to the steering wheel and the second shaft connected to the gear box such that the shafts transfer a torque of the steering wheel to the gear box; the intermediate shaft being movable in an axial direction with respect to the first shaft and the second shaft; the first shaft being connected to the intermediate shaft, wherein the first shaft always rotates at the same rotation speed as that of the intermediate shaft; the second shaft being connected to the intermediate shaft, wherein a rotation speed of the second shaft is varied as compared with the first shaft depending on the relative location of the intermediate shaft to the second shaft; and a driving module installed on the column housing and transferring power to the intermediate shaft to allow the intermediate shaft to move in the axial direction.

DETAILED DESCRIPTION OF THE EMBODIMENTS

Hereinafter, an electric steering column device for a vehicle according to an embodiment of the present disclosure will be described with reference to the accompanying drawings.

In some implementations, a motor drive power steering (MDPS) system includes an electric motor connected to a shaft of the steering wheel, and may easily rotate the steering wheel by using a torque provided from the electric motor as an auxiliary torque.

When the driver rotates the steering wheel, however, a pinion of a steering gear rotates by the same angle at that of the steering wheel, the rotation is changed into reciprocation by a helical gear, and a steering angle of the tire is then determined. As such, since a mechanism from the steering wheel to the steering gear is fixed in a solid type, when a hardware specification is determined, steering responsibility in the vehicle is also determined.

As described above, responsibility of the steering wheel may not be changed depending on a driving speed of the vehicle, driving tendency of the driver, or the like, such that it is difficult to satisfy the driver, and optimized responsibility may not be provided in various driving conditions.

Figure 1:
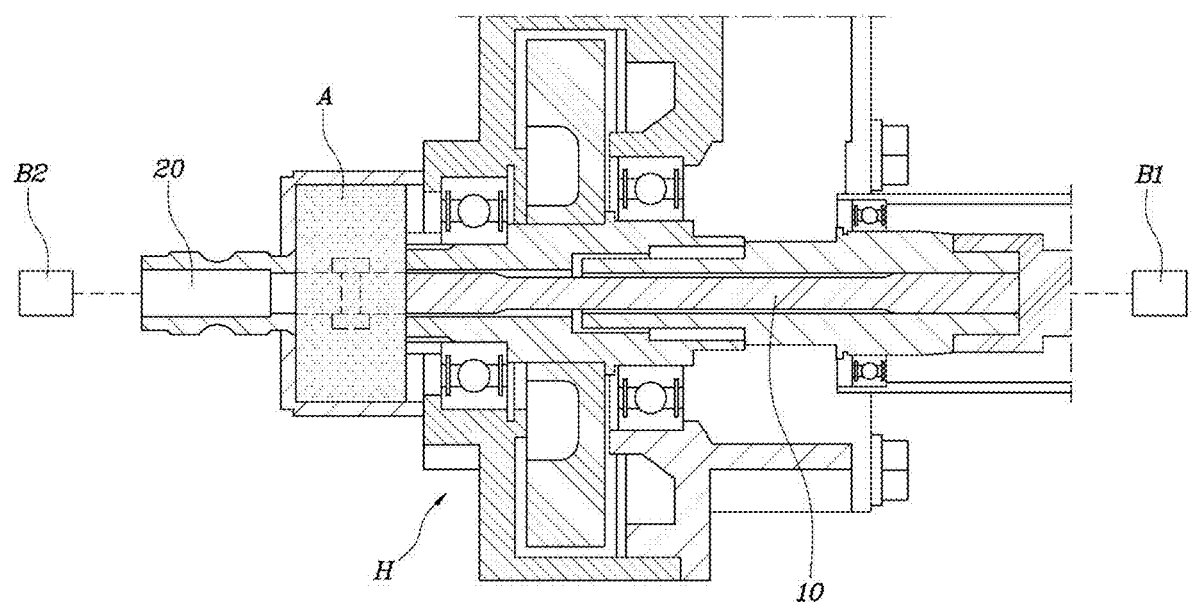
FIG. 1 is a view illustrating a column housing according to the present disclosure.
Figure 2:
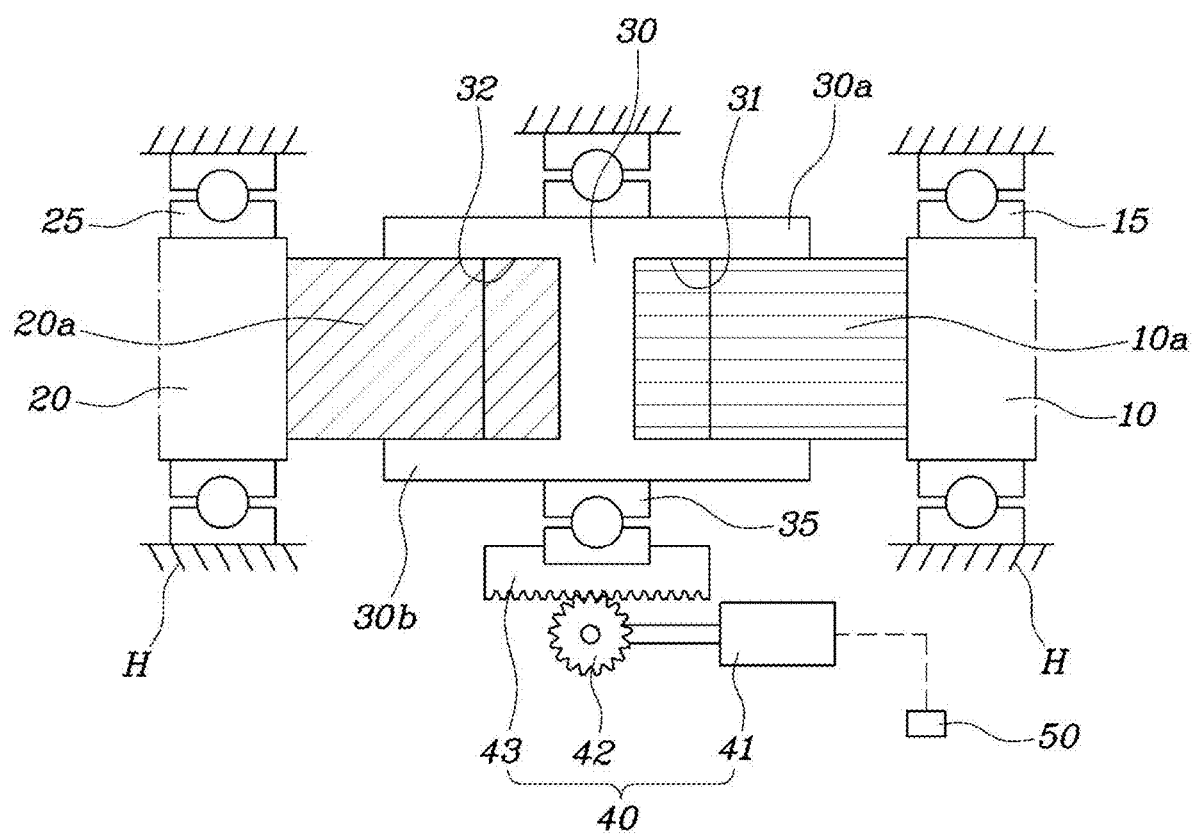
FIG. 2 is a view illustrating an electric steering column device for a vehicle according to an embodiment of the present disclosure.
Figure 3:
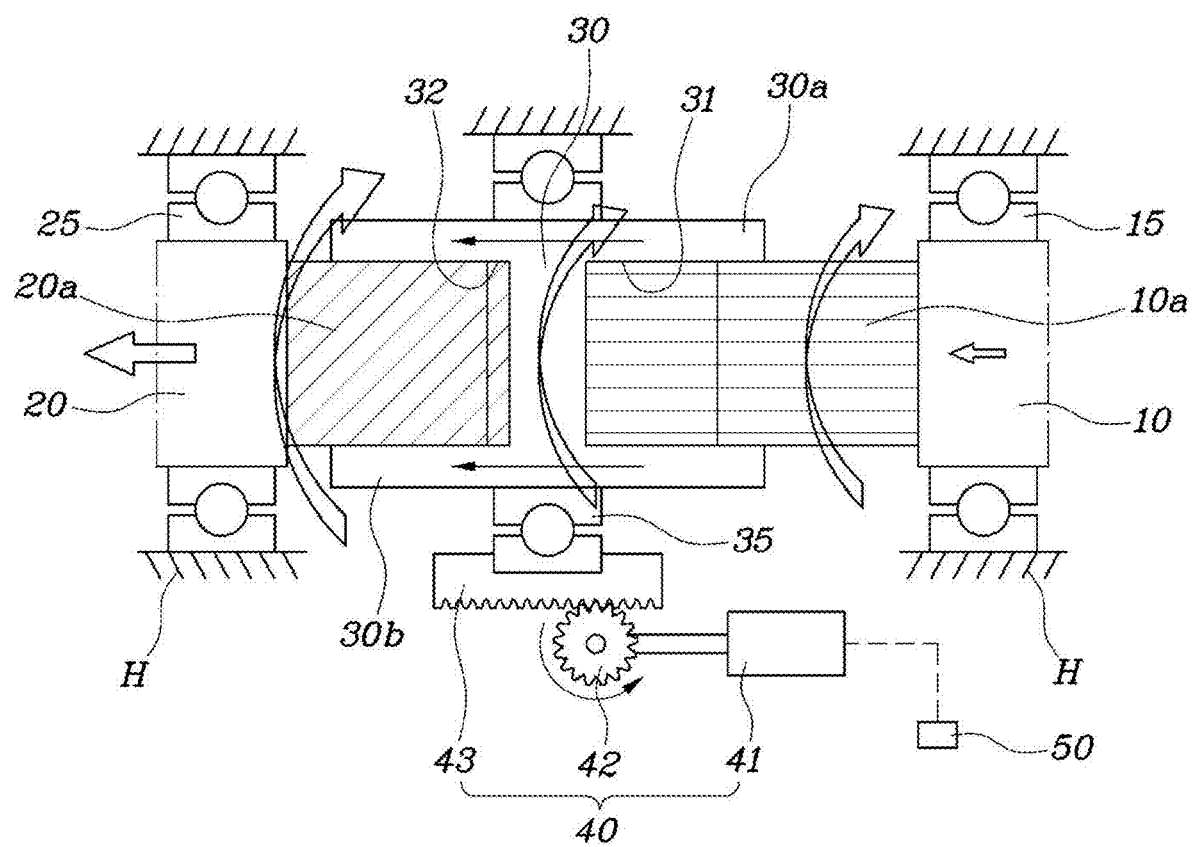
FIGS. 3 and 4 are views for describing an operation of the electric steering column device for a vehicle illustrated in FIG. 2.
Figure 4:
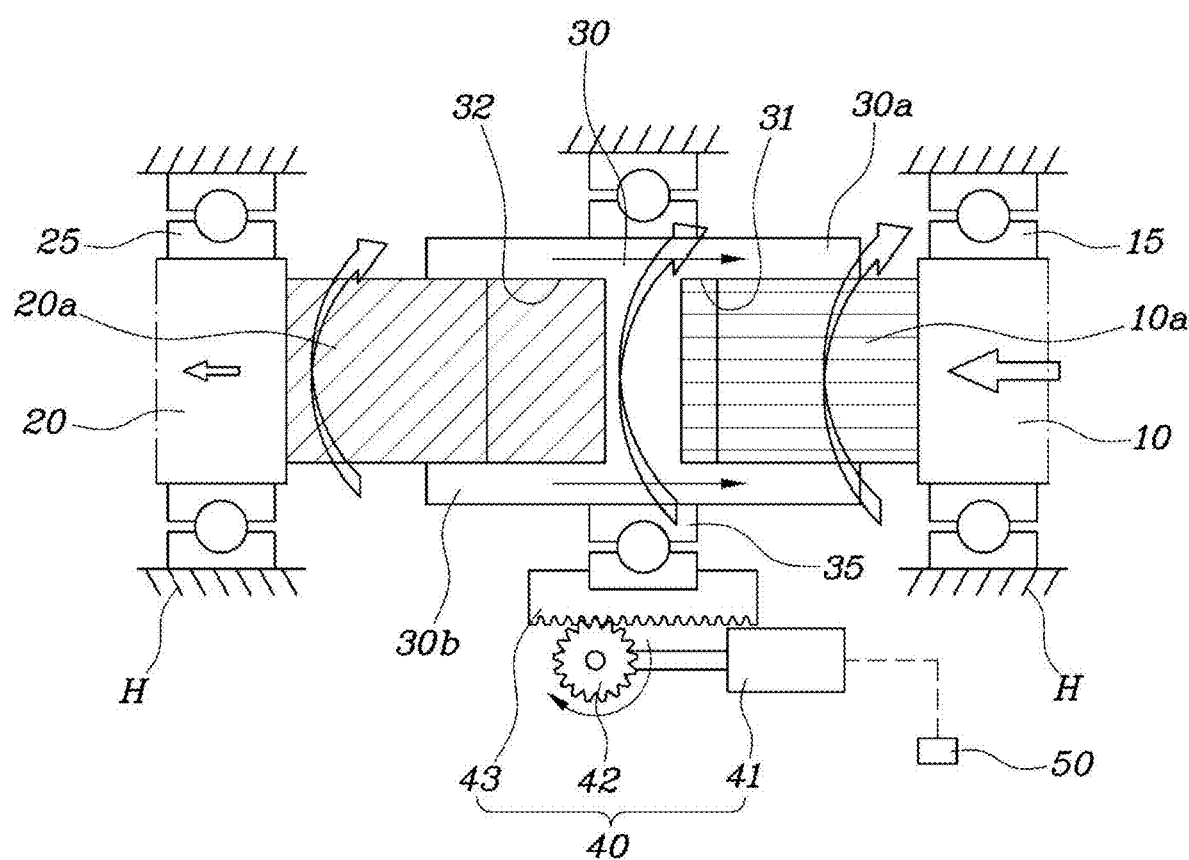

FIG. 1 is a view illustrating a column housing according to the present disclosure, FIG. 2 is a view illustrating an electric steering column device for a vehicle according to an embodiment of the present disclosure, and FIGS. 3 and 4 are views for describing an operation of the electric steering column device for a vehicle illustrated in FIG. 2.

In the electric steering column device for a vehicle according to the present disclosure, as illustrated in FIG. 1, a steering shaft is divided within a column housing H, and a driving module is installed in a division section A of the steering shaft to adjust a relative speed of the divided steering shaft, thereby varying steering responsibility.

In detail, as illustrated in FIG. 2, the electric steering column device for a vehicle includes a first shaft 10 and a second shaft 20 provided in the column housing H and transferring a torque of a steering wheel to a gear box; a variable shaft 30 provided in the column housing H so as to be movable in an axial direction of the first shaft 10 and the second shaft 20 and connected to the first shaft 10 and the second shaft 20 so as to rotate together with the first shaft 10 and the second shaft 20, the first shaft 10 being connected to the variable shaft 30 so that the first shaft 10 always rotates at the same rotation speed as that of the variable shaft 30 and the second shaft 20 connected to the variable shaft 30 so that a rotation speed of the second shaft 20 is varied as compared with the first shaft 10 depending on whether or not the variable shaft 30 moves in the axial direction; and a driving module 40 installed on the column housing H and transferring power to the variable shaft 30 to allow the variable shaft 30 to move in the axial direction.

Here, the first shaft 10 may extend to the steering wheel and be connected to a decelerator B1, and the second shaft 20 may extend to the gear box and be connected to a U-joint B2. Therefore, an operation force of the steering wheel is transferred through the first shaft 10, passes through the variable shaft 30, and is then transferred to the second shaft 20. In some instances, the variable shaft 30 may be referred to a connection shaft for connecting the first and second shafts. In other instances, the variable shaft 30 may be referred to as an intermediate shaft as it is located between the first and second shaft.

Particularly, the variable shaft 30 allowing the first shaft 10 and the second shaft 20 to be connected to each other is provided in the column housing H so as to be movable in the axial direction. In addition, the first shaft 10 is connected to the variable shaft 30 so that it always rotates at the same rotation speed as that of the variable shaft 30, and the second shaft 20 is connected to the variable shaft 30 so that the rotation speed of the second shaft 20 is varied as compared with the first shaft 10 at the time of the movement of the variable shaft in the axial direction. Therefore, in a case where a position of the variable shaft 30 is not varied, rotation speeds of the first shaft 10, the variable shaft 30, and the second shaft 20 are the same as one another, and in a case where a position of the variable shaft 30 is varied, the first shaft 10 and the variable shaft rotate at the same rotation speed and the rotation speed of the second shaft 20 is increased or decreased as compared with the first shaft 10 depending on a moving direction of the variable shaft 30, such that steering performance may be improved through adjustment of steering responsibility based on an operation of the steering wheel.

To this end, the driving module 40 transferring the power to the variable shaft 30 to allow the variable shaft 30 to move in the axial direction is installed on the column housing H. Such a driving module 40 moves the variable shaft 30 in the axial direction to allow the rotation speed of the second shaft 20 to be adjusted.

Such a driving module 40 may be controlled by a controller 50. The controller 50 receives driving information of the vehicle and controls the driving module based on the driving information of the vehicle to control a moving direction of the variable shaft 30, thereby allowing a steering response speed to be changed due to a variation in the rotation speed of the second shaft 20. Here, the driving information of the vehicle may be a steering torque collected through a torque sensor, a steering angle collected through a steering angle sensor, a lateral acceleration collected through a G sensor, and a vehicle driving speed collected through a vehicle speed sensor, and the controller 50 may acquire various types of information at the time of operation of the steering wheel to derive optimal steering responsibility depending on a driving state of the vehicle. The steering responsibility depending on the driving state of the vehicle may be performed on the basis of pre-stored map data. As an example, in a case where a rapid turning situation occurs, control is performed so that the steering responsibility is improved, and in a case where external force is input from a road surface at the time of driving the vehicle, control is performed so that the steering responsibility is decreased, such that the steering response speed may be adjusted depending on a driving situation. As described above, the steering responsibility of the steering wheel is adjusted depending on the driving state of the vehicle, such that optimized steering performance is secured.

The controller 50 according to an embodiment of the present disclosure described above may be implemented through a non-volatile memory configured to store an algorithm configured to control operations of various components of the vehicle or data on software instructions reproducing the algorithm and a processor configured to perform operations to be described below using the data stored in the non-volatile memory. Here, the memory and the processor may be implemented as individual chips. Alternatively, the memory and the processor may be integrated with each other and implemented as a single chip. The processor may have a form of one or more processors.

The present disclosure described above will be described in detail. As illustrated in FIG. 2, the first shaft 10 may be connected to one end portion 30a of the variable shaft 30 in a spline structure, and the second shaft 20 may be connected to the other end portion 30b of the variable shaft 30 in a screw structure. Therefore, one end portion 30a of the variable shaft 30 and the first shaft 10 are connected to each other in the spline structure, such that movement of the variable shaft 30 in the axial direction may be allowed in the first shaft 10 and the variable shaft 30 and the first shaft 10 may rotate the same rotation speed. In addition, the other end portion 30b of the variable shaft 30 and the second shaft 20 are connected to each other in the screw structure, such that the second shaft 20 moves while rotating with respect to the variable shaft 30. As a result, a difference in a rotation speed between the first shaft 10 rotating at the same rotation speed as that of the variable shaft 30 and the second shaft 20 may be generated.

In detail, a first hole or recess 31 into which an insertion end portion 10a of the first shaft 10 is inserted may be formed in one end portion 30a of the variable shaft 30, and spline gears extending in a straight line shape in the axial direction may be formed on an outer peripheral surface of the insertion end portion 10a of the first shaft 10 and an inner peripheral surface of the first hole 31 so as to be matched to each other. As described above, the insertion end portion 10a of the first shaft 10 is inserted into the first hole 31 of the variable shaft 30, and the spline gears extending in the straight line shape are formed on the first hole 31 and the insertion end portion 10a of the first shaft 10 so as to be matched to each other, such that the variable shaft 30 may rotate at the same rotation speed as that of the first shaft 10 while moving in the axial direction.

In addition, a second hole or recess 32 into which an insertion end portion 20a of the second shaft 20 is inserted may be formed in the other end portion 30b of the variable shaft 30, and screw gears extending in a spiral shape in the axial direction may be formed on an outer peripheral surface of the insertion end portion 20a of the second shaft 20 and an inner peripheral surface of the second hole 32 so as to be matched to each other. As described above, the insertion end portion 20a of the second shaft 20 is inserted into the second hole 32 of the variable shaft 30, and the screw gears extending in the spiral shape are formed on the second hole 32 and the insertion end portion 20a of the second shaft 20 so as to be matched to each other, such that the second shaft 20 may move while rotating along a screw thread at the time of the movement of the variable shaft. Here, a direction of the screw thread having the spiral shape may be determined depending on a moving direction of the variable shaft 30 based on an operation of the driving module 40.

In one embodiment, the first hole 31 may be a blind hole extending in an axial direction from a first end of the connection shaft 30. The second hole 32 may be a blind hole extending in the axial direction from a second end of the connection shaft 30. In another embodiment, the connection shaft 30 includes a through hole extending from the first end to the second end. The through hole includes a first hole end portion for receiving the end portion of the first shaft, and a second hole end portion for receiving the end portion of the second shaft.

Meanwhile, the first shaft 10 and the second shaft 20 may be installed in the column housing H so as to be rotatable through a first bearing 15 and a second bearing 25, respectively, such that the first shaft 10 and the second shaft 20 may rotate in the column housing H. Here, the first bearing 15 and the second bearing 25 may be ball bearings.

In addition, the variable shaft 30 may be installed in the column housing H so as to be rotatable through a third bearing 35. Here, the third bearing 35 may be a ball bearing, is installed in the column housing H so as to be movable in the axial direction, and is connected to the driving module 40 and receive the power from the driving module 40 to move. In embodiments, the third bearing 35 is installed in the column housing H so as to be movable in the axial direction of the first shaft 10 and the second shaft 20, and receives the power of the driving module 40, such that a position of the third bearing 35 is changed. Therefore, the variable shaft 30 moves together with the third bearing 35 by movement of the third bearing 35, such that a position of the variable shaft 30 is changed.

In detail, the driving module 40 may include an electric motor 41 fixedly installed in the column housing H and including a pinion 42 rotating at the time of transferring the power; and a rack bar 43 coupled to the third bearing 35 and gear-connected to the pinion 42 to linearly move in the axial direction at the time of the rotation of the pinion 42.

Here, the electric motor 41 may be a motor capable of normal/reverse rotation, and is configured to rotate the pinion 42 at the time of transferring the power. The rack bar 43 coupled to the third bearing 35 is gear-connected to such a pinion 42, such that the pinion 42 rotates at the time of operation of the electric motor 41, and the rack bar 43 linearly moves by the rotation of the pinion 42. Therefore, the variable shaft 30 may move in the axial direction together with the rack bar 43.

The electric steering column device as described above may be operated as follows.

As illustrated in FIG. 2, in a case where the driving module 40 is not operated, the variable shaft 30 is positioned in an initial position, such that rotation speeds of the first shaft 10, the variable shaft 30, and the second shaft 20 are the same as one another.

As illustrated in FIG. 3, in a case where the driving module 40 is operated, such that the pinion 42 rotates, the variable shaft 30 moves together with the rack bar 43 and the third bearing 35 to the left of the drawing. At the same time, the second shaft 20 connected to the variable shaft 30 in the screw structure moves while rotating along the screw thread, such that the second shaft 20 rotates at a rotation speed faster than that of the first shaft 10. Therefore, an effect that the steering responsibility is increased is generated.

To the contrary, as illustrated in FIG. 4, in a case where the driving module 40 is reversely operated, such that the pinion 42 rotates in an opposite direction, the variable shaft 30 moves together with the rack bar 43 and the third bearing 35 to the right of the drawing. At the same time, the second shaft 20 connected to the variable shaft 30 in the screw structure moves while rotating along the screw thread, such that a rotation speed of the second shaft 20 is decreased as compared with the first shaft 10. Therefore, an effect that the steering responsibility is decreased is generated.

Therefore, the steering responsibility of the steering wheel may be adjusted depending on the driving state of the vehicle, and the steering performance may be adjusted by adjusting the steering responsibility depending on the operation of the steering wheel.

The electric steering column device for a vehicle having the structure as described above secures an optimized steering performance by adjusting the steering responsibility of the steering wheel.

Although the present disclosure has been shown and described with respect to embodiments, it will be apparent to those having ordinary skill in the art that the present disclosure may be variously modified and altered without departing from the spirit and scope of the present disclosure as defined by the following claims.

What is claimed is:

1. An electric steering column device for a vehicle, comprising:
   a column housing;
   a first shaft and a second shaft provided in the column housing and transferring a torque of a steering wheel to a gear box;
   a connection shaft provided in the column housing and movable in an axial direction of the first shaft and the second shaft, the connection shaft being connected to the first shaft and the second shaft so as to rotate together with the first shaft and the second shaft, the first shaft being connected to the connection shaft so that the first shaft always rotates at the same rotation speed as that of the connection shaft and the second shaft being connected to the connection shaft so that a rotation speed of the second shaft is varied as compared with the first shaft depending on whether or not the connection shaft moves in the axial direction; and
   a driving module installed on the column housing and transferring power to the connection shaft to allow the connection shaft to move in the axial direction
   wherein the first shaft is connected to one end portion of the connection shaft in a spline structure, and the second shaft is connected to an other end portion of the connection shaft in a screw structure.

2. The electric steering column device for a vehicle of claim 1, wherein a first hole into which an insertion end portion of the first shaft is inserted is formed in the one end portion of the connection shaft, and spline gears extending in a straight line shape in the axial direction are formed on an outer peripheral surface of the insertion end portion of the first shaft and an inner peripheral surface of the first hole so as to be matched to each other.

3. The electric steering column device for a vehicle of claim 1, wherein a second hole into which an insertion end portion of the second shaft is inserted is formed in the other end portion of the connection shaft, and screw gears extending in a spiral shape in the axial direction are formed on an outer peripheral surface of the insertion end portion of the second shaft and an inner peripheral surface of the second hole so as to be matched to each other.

4. The electric steering column device for a vehicle of claim 1, wherein the first shaft and the second shaft are installed in the column housing so as to be rotatable through a first bearing and a second bearing, respectively.

5. The electric steering column device for a vehicle of claim 1, wherein the connection shaft is installed in the column housing so as to be rotatable through a third bearing, and
   the third bearing is installed in the column housing so as to be movable in the axial direction and is connected to the driving module and receives the power from the driving module to move.

6. The electric steering column device for a vehicle of claim 5, wherein the driving module includes:
   an electric motor fixedly installed in the column housing and including a pinion rotating at the time of transferring the power; and
   a rack bar coupled to the third bearing and gear-connected to the pinion to linearly move in the axial direction at the time of the rotation of the pinion.

7. The electric steering column device for a vehicle of claim 1, further comprising a controller receiving driving information of the vehicle and controlling the driving module based on the driving information of the vehicle to control a moving direction of the connection shaft, thereby allowing a steering response speed to be changed due to the variation in the rotation speed of the second shaft.

8. An electric steering column device for a vehicle, comprising:
   a column housing;
   a first shaft and a second shaft provided in the column housing and transferring a torque of a steering wheel to a gear box;
   a connection shaft provided in the column housing and movable in an axial direction of the first shaft and the second shaft, the connection shaft being connected to the first shaft and the second shaft so as to rotate together with the first shaft and the second shaft, the first shaft being connected to the connection shaft so that the first shaft always rotates at the same rotation speed as that of the connection shaft and the second shaft being connected to the connection shaft so that a rotation speed of the second shaft is varied as compared with the first shaft depending on whether or not the connection shaft moves in the axial direction; and
   a driving module installed on the column housing and transferring power to the connection shaft to allow the connection shaft to move in the axial direction,
   wherein the connection shaft is installed in the column housing so as to be rotatable through a third bearing,
   wherein the third bearing is installed in the column housing so as to be movable in the axial direction and is connected to the driving module and receives the power from the driving module to move, and
   wherein the driving module includes
       an electric motor fixedly installed in the column housing and including a pinion rotating at the time of transferring the power, and
       a rack bar coupled to the third bearing and gear-connected to the pinion to linearly move in the axial direction at the time of the rotation of the pinion.

9. The electric steering column device for a vehicle of claim 8, wherein the first shaft and the second shaft are installed in the column housing so as to be rotatable through a first bearing and a second bearing, respectively.

10. The electric steering column device for a vehicle of claim 8, further comprising a controller receiving driving information of the vehicle and controlling the driving module based on the driving information of the vehicle to control a moving direction of the connection shaft, thereby allowing a steering response speed to be changed due to the variation in the rotation speed of the second shaft.

* * * * *